April 21, 1925.
G. J. FOSTER
1,534,207
PROCESS AND APPARATUS FOR SCALDING ANIMALS
Filed Aug. 9, 1924
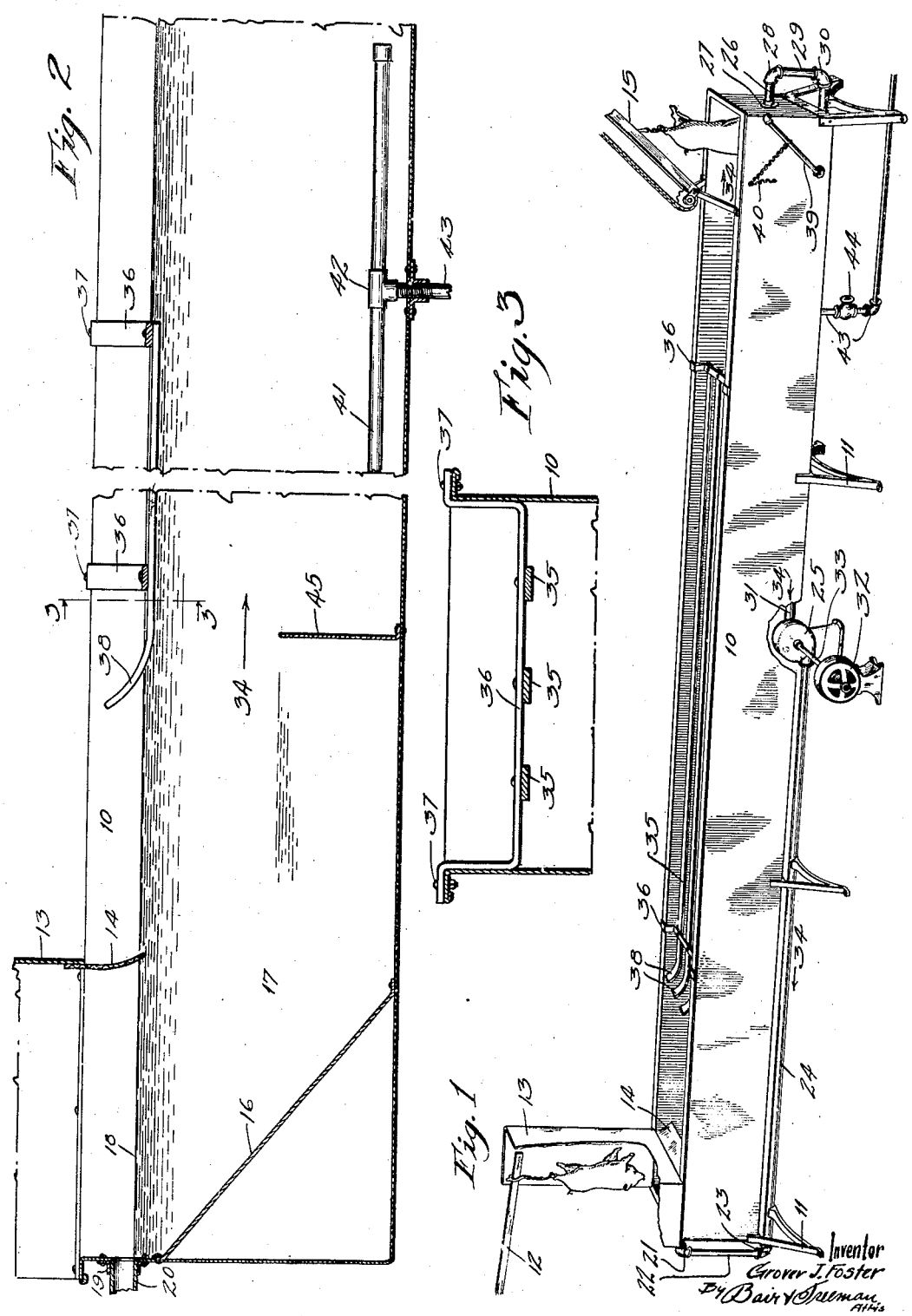

Patented Apr. 21, 1925.

1,534,207

UNITED STATES PATENT OFFICE.

GROVER J. FOSTER, OF SIOUX CITY, IOWA.

PROCESS AND APPARATUS FOR SCALDING ANIMALS.

Application filed August 9, 1924. Serial No. 731,048.

*To all whom it may concern:*

Be it known that I, GROVER J. FOSTER, a citizen of the United States, and a resident of Sioux City, in the county of Woodbury and State of Iowa, have invented certain new and useful Improvements in Processes and Apparatus for Scalding Animals, of which the following is a specification.

My invention relates to the art of scalding animals, particularly hogs, in a packing plant.

It is my object to provide apparatus for scalding hogs in which a part of the operations are made automatic in order that the services of a number of men ordinarily necessary to conduct certain operations may be eliminated.

More particularly it is my object to provide a scalding tank in which the scalding liquid is circulated from end to end of the tank in order to convey the hogs through the tank, and in which a longitudinally extending rack is provided, adapted to force the hogs under the surface of the liquid for completely immersing them.

More generally it is my object to accomplish by such an art and apparatus the more complete and uniform scalding of the hogs, and to eliminate the puncturing of the hide of the animals by the sharp pointed hooks commonly used to control the course of the hog through a scalding tank, and to thus eliminate the injurious consequences attendant thereon.

With these and other objects in view, my invention consists in the construction, arrangement and combination of the various parts of my device, whereby the objects contemplated are attained, as hereinafter more fully set forth, pointed out in my claims and illustrated in the accompanying drawings, in which:

Fig. 1 is a perspective view of my apparatus, including the means for conveying the hogs into and removing the hogs from the tank.

Fig. 2 is an enlarged longitudinal sectional view through portions of the tank, the liquid being shown therein.

Fig. 3 is a transverse sectional view, illustrating the method of supporting the rack, taken on the line 3—3 of Fig. 2.

Before proceeding to describe specifically my invention, I will attempt to set forth in detail the present method in common use of scalding hogs.

The hog is first captured. A hook is attached to his leg and he is lifted by a vertically revolving disk to the sticking rail, where he is killed. After having bled he is conveyed along the rail to the scalding apparatus.

A large sheet metal tank about 60 ft. long and 5 ft. square in cross section is ordinarily used for this purpose. It is filled with an alkaline solution to a depth of about 4 ft. and the hogs are dropped into one end thereof from the end of the sticking rail. The ordinary hog is of considerably lighter specific gravity than the solution used in the tank. The animal therefore tends to float with a portion of the body exposed above the surface of the liquid. As the hog rises to the surface of the liquid, an operator with a pole armed with a sharp hook at its end turns the hog to a position extending transversely of the tank. He then pushes it toward the other end of the tank until it is reached by another operator armed with a similar instrument, who pushes the hog under the liquid at frequent intervals in order that the entire hog may be scalded. Several of these men are stationed along the length of the tank and each of them in turn submerges the animal.

When the hog reaches the remote end of the tank he is attached by an operator to a suitable conveyor which lifts him from the tank.

The object in turning the hogs transversely of the tank is to allow a maximum number of them to remain in the tank while being scalded and at the same time to move them through the tank at as rapid a pace as possible.

My invention contemplates doing away with the necessity of the workman pushing the hog through the tank, and also with immersing the hog in the liquid. I have found that a large number of hogs leave the tank with punctures in their hides, caused by the sharp pointed hooks of the operators. These punctures allow the caustic solution to reach the flesh of the animal and to carry thereto germs and bacteria necessarily present in the liquid. The temperature of the scalding liquid is not sufficiently high to kill such bacteria, and as a result portions of the meat of the animals sometimes become spoiled or discolored or do not cure properly. This is especially true of hams.

In the accompanying drawings I have used the reference character, 10, to indicate the ordinary tank, which may be supported by legs, 11. The sticking rail, 12, extends over one end of the tank and a screen, 13, of sheet metal or other material is provided to minimize the splashing of the liquid over the sides of the tank when the hog is dropped thereinto. At the lower edge of the screen a canvas flapper, 14, is provided to prevent the liquid being splashed toward the workman nearest the end of the tank. This is of the ordinary construction and does not form a part of my invention.

At the other end of the tank is the conveying apparatus for removing the hog from the tank, which I have indicated generally by the numeral, 15. A baffle plate, 16, is fixed to the rear end of the tank below the screen, 13, and serves to deflect the hog forwardly in the tank. The alkaline solution has been indicated by the numeral, 17, and ordinarily is maintained at the level shown at 18.

I provide a circulating system as follows. To the rear end of the tank is fixed, by means of a pipe flange, 19, a short inlet pipe, 20, which is preferably about 6 in. in diameter. By means of the elbow, 21, the vertical pipe, 22, the elbow, 23, and the horizontal pipe, 24, extending under the tank, the inlet is connected to a low pressure pump, 25, adapted to handle a large quantity of liquid.

The liquid escapes from the tank through a short outlet pipe, 26, connected to the tank by a pipe flange, 27, and to the pump, 25, through the medium of the elbow, 28, the vertical section, 29, the elbow, 30, and the horizontal pipe, 31. This outlet piping is preferably 8 in. in diameter. The pump, 25, is actuated by any suitable source of power, such as the electric motor, 32, connected to the pump by means of the shaft, 33. It will thus be seen that when the pump, 25, is actuated a circulation will will be created through the system, as indicated by the arrows, 34.

As the hogs are dropped into the tank in the rear end they will be carried by the current toward the forward end of the tank. One operator will be stationed at the rear end of the tank, who will turn the hogs to a position transverse of the tank.

I provide a submerging rack which comprises the horizontal bars, 35, fixed to the under sides of the cross braces, 36, which are in turn fixed, as at 37, to the edges of the tank. By fixing the bars to the under side of the braces, 36, no obstruction is offered to the passage of the animal under the bars. The forward ends of the bars, 35, are curved upwardly, as at 38, so that the hog may be engaged and gradually forced down into the liquid.

As shown in the drawings, the normal position of the liquid is about on a level with the submerging rack, the rack bars, 35, being preferably a little below the level of the liquid.

In order to control the level of the liquid a pivoted overflow pipe, 39, which may be adjusted by means of a chain, 40, is provided. This is of the ordinary construction.

The liquid is heated by means of a perforated pipe, 41, connected by means of a T, 42, and piping, 43, to a source of steam, whereby steam may be inserted into the tank. A valve, 44, controls the entrance of steam to the tank. This is also of the ordinary construction and does not form a part of my invention.

The baffle plate, 45, is provided, extending from side to side of the tank, which serves to increase the force of the current under the forward ends of the bars, 38, in order that there may be no tendency of the hogs to become lodged against the bars. The plate, 45, is preferably of about one-half the height of the water level.

The advantages of my apparatus have been already mentioned, but it may be added that the number of hogs that can be properly scalded is materially increased when my apparatus is used by immersing the hog constantly instead of only at intervals. The complete scalding may be accomplished in a shorter time and the hog may therefore be moved more rapidly through the tank. This may be controlled by the current produced in the liquid by regulating the speed of the motor. Thus it will be seen that the length of time taken for scalding the hog may be very accurately adjusted so as to obtain the most efficient results, and when once adjusted may be maintained constantly. The control of the hog when passing through the tank is rendered automatic except in so far as it is necessary to adjust the hog to the correct position transverse of the tank.

The services of at least three men may be dispensed with by the use of this apparatus in a modern sized plant.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A scalding apparatus including an elongated tank, means for conveying an animal into and removing the same from the tank, a scalding liquid in the tank, means for creating a circulation of the liquid from end to end of the tank, and a rack extending longitudinally of the tank and adapted to immerse the animals completely in the liquid as they pass under the rack.

2. A scalding apparatus including an elongated tank, a scalding liquid therein, means for creating a circulation of the liquid from end to end of the tank, and a rack extending longitudinally of the tank adapted to immerse completely in the liquid, an animal carried under the rack by the current.

3. A scalding apparatus including an elongated tank, a scalding liquid therein, means for creating a circulation of the liquid from end to end of the tank, and a rack extending longitudinally of the tank, said rack being positioned slightly below the normal level of the liquid.

4. A scalding apparatus including an elongated tank, a scalding liquid therein, means for creating a circulation of the liquid from end to end of the tank, and a rack extending longitudinally of the tank, said rack comprising cross braces fixed to the sides of the tank, and longitudinal bars fixed to the cross braces, the rack being positioned below the normal level of the liquid.

5. A scalding apparatus including an elongated tank, a scalding liquid therein, means for creating a circulation of the liquid from end to end of the tank, and a rack extending longitudinally of the tank, said rack comprising cross braces fixed to the sides of the tank, and longitudinal bars fixed to the cross braces on the under side thereof.

6. A scalding apparatus including an elongated tank, a scalding liquid therein, means for creating a circulation of the liquid from end to end of the tank, and a rack extending longitudinally of the tank, said rack comprising cross braces fixed to the sides of the tank, and longitudinal bars fixed to the cross braces, the rack being positioned near the normal level of the liquid.

7. A scalding apparatus for hogs including an elongated tank, a scalding liquid therein, means for conveying the hogs to the tank, means for removing the hogs from the tank, means for creating a current from end to end of the tank, and a rack adapted to immerse in the liquid, hogs carried thereunder by the current.

8. A scalding apparatus including an elongated tank, a scalding liquid therein, means for creating a circulation of the liquid from end to end of the tank, and a rack extending longitudinally of the tank, said rack including bars extending longitudinally of the tank, the forward ends of the bars being inclined upwardly.

9. A scalding apparatus including an elongated tank, a scalding liquid therein, means for creating a circulation of the liquid from end to end of the tank, a rack extending longitudinally of the tank, said rack being positioned slightly below the normal level of the liquid, and a baffle plate under the forward end of the rack for concentrating the current in the upper strata of the liquid.

10. The art of scalding animals which includes the dropping of the animals into an elongated tank partly filled with a scalding liquid, creating a current in the liquid to carry the animals to the other end of the tank, turning the animals to position extending transversely of the tank, and allowing the current to carry them under a rack adapted to completely immerse them in the liquid.

11. The art of scalding animals which includes the dropping of the animals into an elongated tank partly filled with a scalding liquid, creating a current in the liquid to carry the animals longitudinally of the tank, and allowing the current to carry them under a rack adapted to immerse them in the liquid.

12. A scalding apparatus including an elongated tank, a scalding liquid therein, means for creating circulation of the liquid longitudinally of the tank, and a rack extending longitudinally of the tank adapted to immerse in the liquid an animal carried under the rack by the current.

13. A scalding apparatus including an elongated tank and a stationary rack therein extending longitudinally of the tank and supported near the normal level of the scalding liquid contained in the tank, said rack being adapted to immerse in the liquid animals propelled thereunder.

14. A scalding apparatus including an elongated tank, a scalding liquid therein, a rack supported near the normal level of said liquid and extending longitudinally of the tank, said rack being adapted to immerse in the liquid hogs propelled thereunder.

15. A scalding apparatus including an elongated tank, a scalding liquid therein, a rack supported near the normal level of said liquid and extending longitudinal of the tank, and means for propelling hogs floated in said liquid under said rack.

Signed at Sioux City, in the county of Woodbury and State of Iowa, this 29th day of July, 1924.

GROVER J. FOSTER.